United States Patent [19]

Wilks

[11] Patent Number: 4,583,712
[45] Date of Patent: Apr. 22, 1986

[54] EVAPORATOR LIFT

[76] Inventor: David W. Wilks, 210 W. Palfrey, San Antonio, Tex. 78223

[21] Appl. No.: 666,153

[22] Filed: Oct. 29, 1984

[51] Int. Cl.⁴ .............................................. B66F 13/00
[52] U.S. Cl. ................... 254/89 R; 254/98; 254/101; 254/133 A; 254/DIG. 4
[58] Field of Search ................. 254/2 R, 2 C, 98, 100, 254/101, 134, 133 A, 89 R, DIG. 4

[56] References Cited

U.S. PATENT DOCUMENTS

| | | | |
|---|---|---|---|
| 2,532,168 | 11/1950 | Jakovbek | 254/100 |
| 3,642,243 | 2/1972 | Eugene | 254/98 |
| 3,948,484 | 4/1976 | Tesinsky | 254/134 |

FOREIGN PATENT DOCUMENTS 1208819  9/1959  France .................................. 254/98

Primary Examiner—Robert C. Watson
Attorney, Agent, or Firm—Gunn, Lee & Jackson

[57] ABSTRACT

A method and apparatus for lifting and temporarily supporting an evaporator coil cabinet. The apparatus is place on opposite sides of the cabinet and includes a leg member in telescopic engagement with a threaded shaft. The shaft has a platform on one end thereof which is placed beneath an edge of the cabinet. A hand nut in threaded engagement with the shaft rests atop a shoulder on the leg member. As the hand nut is rotated, the shaft and platform are urged upward, thereby lifting and supporting the cabinet.

11 Claims, 5 Drawing Figures

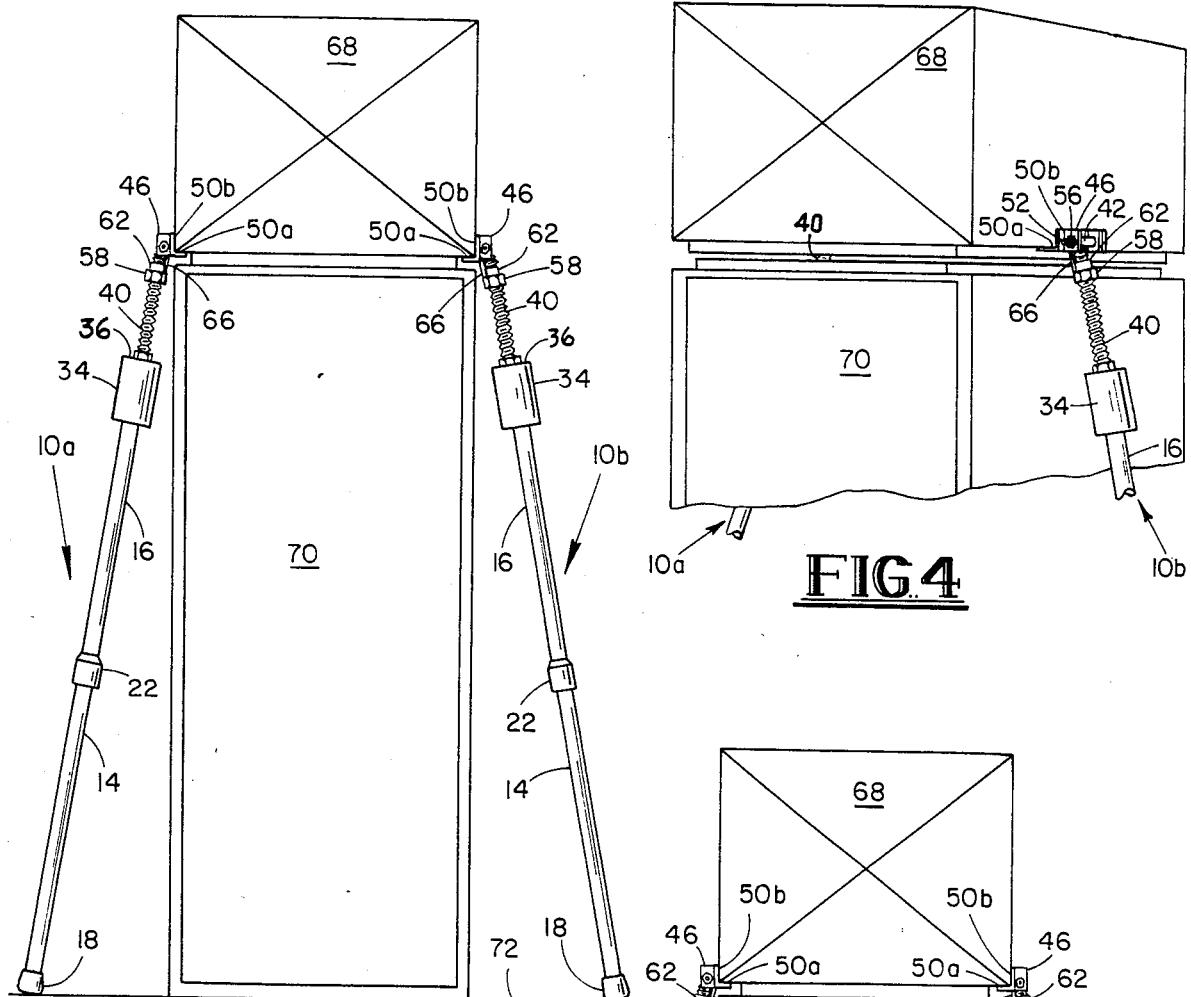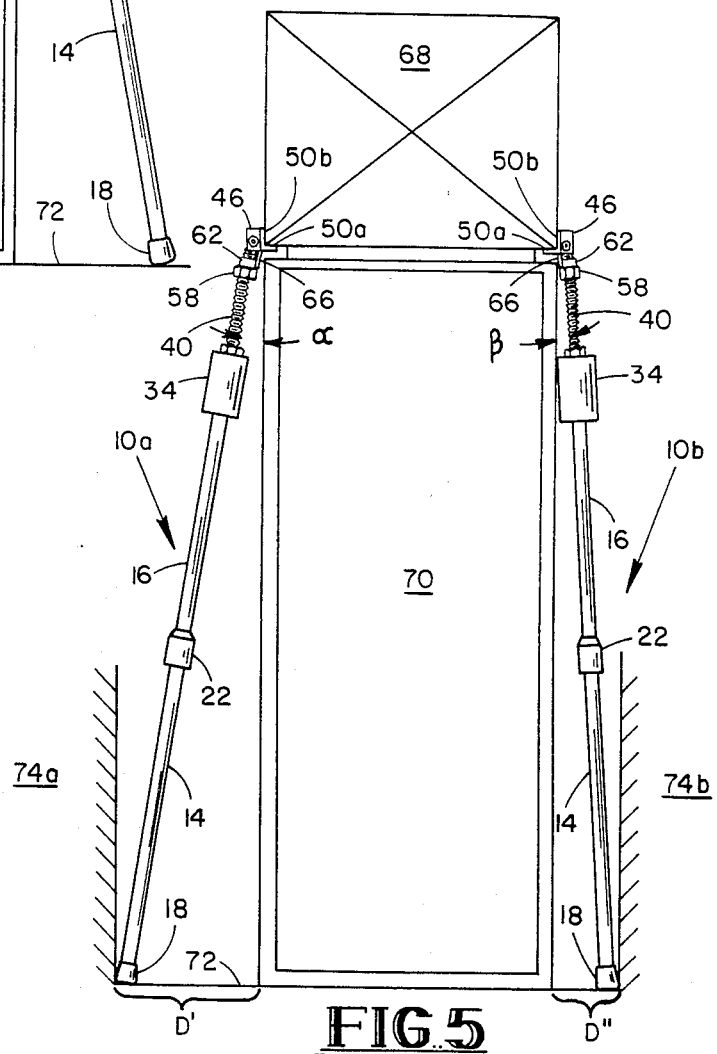

EVAPORATOR LIFT

BACKGROUND OF THE INVENTION

The present invention relates to a method and apparatus for lifting and temporarily supporting an evaporator coil cabinet.

The servicing and/or replacement of a gas furnace typically requires the lifting and temporary support of the evaporator coil cabinet located on top of the furnace. However, the evaporator coil is usually connected to duct work which extends from the evaporator coil cabinet into the wall of the dwelling or other enclosure being serviced by the furnace. The aforementioned duct work thus limits the degree to which the evaporator coil cabinet can be moved relative to the furnace.

Various types of apparatus have heretofore been utilized to temporarily lift the evaporator coil cabinet off of the furnace for removing and/or servicing the latter. For example, a two-by-four or other piece of wood, having a length greater than the height of the furnace, has been placed between the floor and the lower edge of the evaporator cabinet in an attempt to forcefully wedge the cabinet upward. Straps have also been utilized in an attempt to lift and support the evaporator coil cabinet from the attic or other structure above the evaporator. Such prior apparatus have proven to be cumbersome, time consuming, expensive, and of questionable effectiveness.

SUMMARY OF THE INVENTION

Accordingly, the present invention provides an improved method and apparatus for lifting and temporarily supporting an evaporator coil cabinet. The apparatus includes a detachable leg member having a passage therethrough within which to receive a threaded shaft in telescopic engagement therewith. A rotatable platform to be placed beneath the underside of the evaporator coil cabinet is connected to the threaded shaft on the uppermost end thereof. A rotatable hand nut having a threaded passage therethrough within which to receive the threaded shaft is located intermediate the platform and leg member. The hand nut rests atop a shoulder on the uppermost portion of the leg member and causes the platform to move alternately up or down, depending upon the direction the hand nut is rotated.

The method of utilizing the aforementioned apparatus to lift and temporarily support an evaporator coil cabinet comprises placing the lowermost end of the leg member securely against the floor or other support on which the furnace rests. The platform is thereafter placed beneath an edge of the evaporator coil cabinet on one side thereof. If the cabinet is to be lifted completely off the furnace, a similar apparatus is placed on the opposite side of the evaporator coil cabinet in an identical fashion. Once the respective platforms are secure beneath the edge of the opposite sides of the evaporator coil cabinet, the respective hand nuts are rotated, thereby rotating the respective threaded shafts and urging the platforms and evaporator coil cabinet away from the top of the furnace. Once the furnace has been serviced and/or replaced, the hand nuts may be rotated in the opposite direction to lower the evaporator coil cabinet on top of the furnace.

The apparatus is additionally provided with a wedge support and a leveling nut, the latter of which is in threaded engagement with the shaft, to permit the rotatable platform to be angled at the desired degree, thereby permitting a flush engagement between the platform and cabinet edge. The present invention thus requires a minimum clearance of only two and one-half inches (2½ inches) on each side of the furnace in order to readily and effectively lift and temporarily support the evaporator coil cabinet.

BRIEF DESCRIPTION OF THE DRAWINGS

FIG. 3 is a front view illustrating a preferred method for lifting and supporting an evaporator coil cabinet utilizing a preferred embodiment of an evaporator lift.

FIG. 4 is a perspective side view illustrating a preferred method for lifting and supporting an evaporator coil cabinet utilizing a preferred embodiment of an evaporator lift.

FIG. 5 is a front view illustrating alternate usage of the wedge support and leveling nut on a preferred embodiment of an evaporator lift.

DETAILED DESCRIPTION OF THE PREFERRED EMBODIMENT

Figure 1:
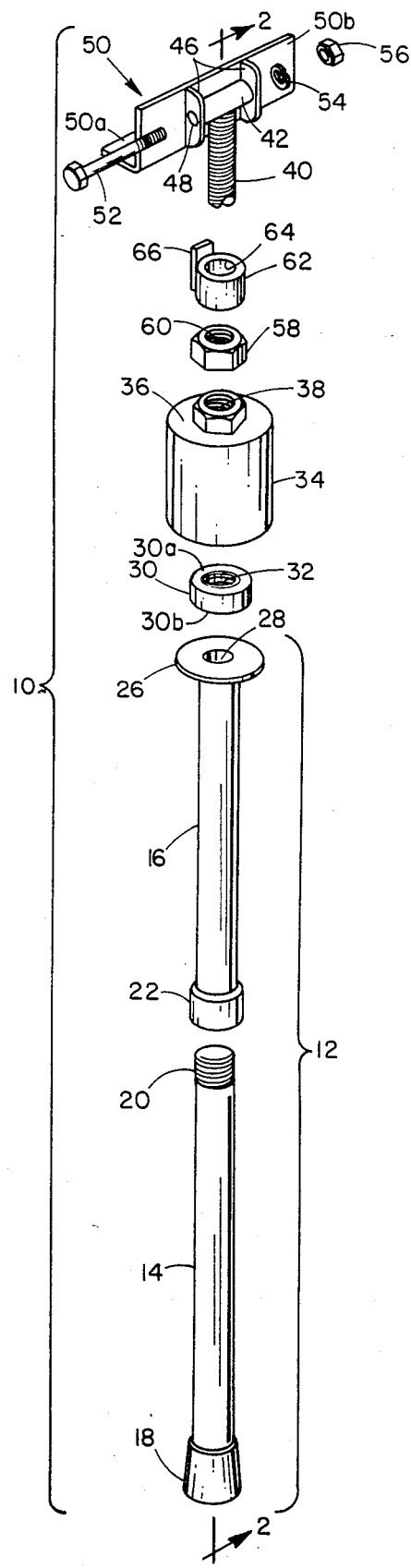
FIG. 1 is an exploded perspective view of a preferred embodiment of an evaporator lift.
Figure 2:
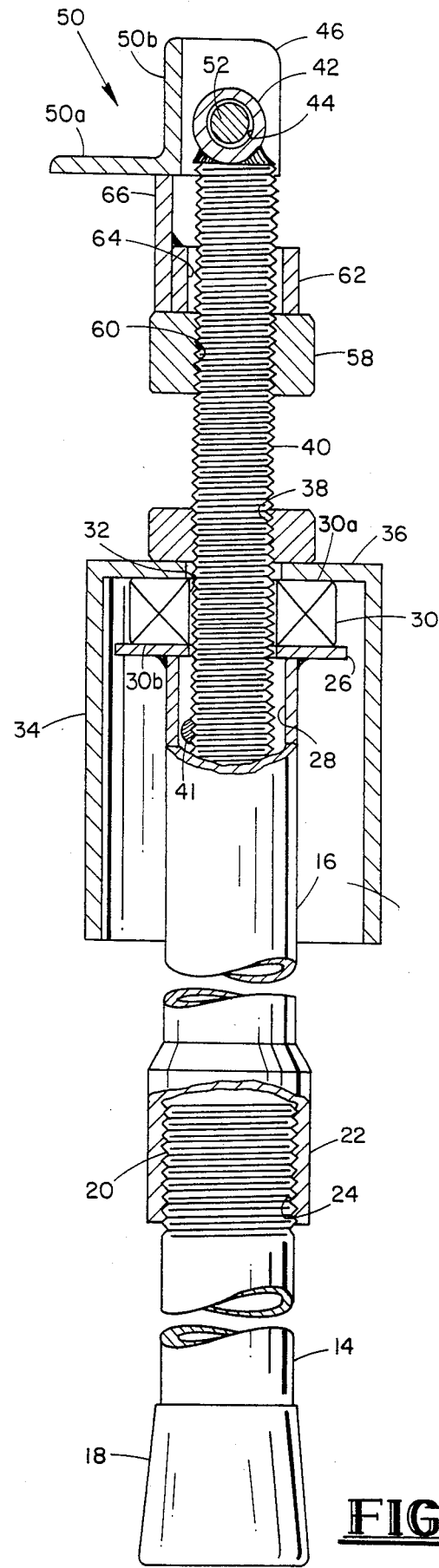
FIG. 2 is an assembled cross sectional view taken along section lines 2—2 of FIG. 1 of a preferred embodiment of an evaporator lift.

Referring to FIG. 1, a preferred embodiment of an evaporator lift apparatus is identified by the number 10. The evaporator lift 10 includes a leg member 12 having a lower portion 14 and an upper portion 16. Leg member 12 is preferably detachable to facilitate transportation thereof. The lower portion 14 has a rubber or plastic cap 18 on the lowermost end thereof and external threads 20 on the uppermost end thereof. Upper portion 16 of leg member 12 has a female bushing 22 on the lowermost end thereof, having internal threads 24, as illustrated in FIG. 2. Internal threads 24 are adapted to receive external threads 20 of lower leg portion 14 in threaded engagement, as further illustrated in FIG. 2. Uppermost leg member 16 has a cylindrical shoulder 26 welded or otherwise connected thereto on the uppermost end thereof and a hollow passage 28 therethrough.

As illustrated in FIG. 2, the evaporator lift 10 further includes a cylindrical bearing 30, having a hollow passage 32 therethrough, which normally rests atop shoulder 26. The evaporator lift 10 also includes a cylindrical hand nut 34 having an uppermost shoulder 36 and a threaded passage 38 therethrough. As further illustrated in FIG. 2, shoulder 36 normally rests atop bearing 30. A threaded shaft 40 normally extends through passages 38, 32, and 28 in threaded engagement with hand nut 34 within passage 38, as further illustrated in FIG. 2. Shaft 40 may also be provided with a weld spot 41 near the lowermost end thereof to prohibit disengagement of nut 34 from shaft 40.

Referring again to FIG. 1 and FIG. 2, the uppermost end of threaded shaft 40 is welded or otherwise connected to a cylindrical bushing 42 having a hollow passage 44 therethrough. Bushing 42 may be inserted between a pair of bosses 46 which are welded or otherwise connected to, and extend perpendicularly outward from, the back side of a right angle platform 50. Bosses 46 each have a cylindrical hole 48 in approximately the center thereof adapted to receive a bolt 52 therethrough. When bushing 42 is placed between bosses 46 in approximately the center thereof, as illustrated in FIG. 1, bolt 52 may be extended through holes 48 and passage 44 and secured by a washer 54 and a nut 56, thereby connecting shaft 40 to platform 50.

Referring again to FIG. 1 and FIG. 2, the evaporator lift 10 further includes a leveling nut 58 having a threaded passage 60 therethrough which is normally in threaded engagement with shaft 40. The evaporator lift 10 also includes a wedge support 62 having a hollow passage 64 therethrough adapted to receive shaft 40 and slide axially thereon. Wedge support 62 is located intermediate nut 58 and platform 50 and has an upstanding boss 66 welded or otherwise connected thereto which is substantially parallel to passage 64 and is adapted to abut against the underside of platform base 50a. Platform base 50a forms a right angle and is preferably integral with platform side 50b to which bosses 46 are connected.

Referring to FIG. 3, like numbers will be utilized for identical components. FIG. 3 illustrates a preferred method for utilizing the evaporator lift 10, shown as identical lifts 10a and 10b, to lift and temporarily support an evaporator coil cabinet 68 which rests atop a furnace 70, the furnace 70 resting atop a floor or other support 72. The leg member 12 is initially assembled by threading the uppermost portion 20 of lower leg member 14 into the lowermost portion 22 of upper leg member 16, as illustrated in FIG. 2 and FIG. 3. Threaded shaft 40 is thereafter inserted through hollow passage 64, threaded passage 60, threaded passage 38, hollow passage 32, and hollow passage 28, as further illustrated in FIG. 2 and FIG. 3. It is to be understood that the uppermost end of shaft 40 will have been previously connected to platform 50 in operative engagement therewith as previously described. It is also to be understood that the evaporator coil cabinet 68 will have been previously unscrewed from furnace 70 in order to slide the base 50a of platform 50 beneath the outer edge of cabinet 68.

As illustrated in FIG. 3, an assembled evaporator lift apparatus 10a is placed on one side of the furnace 70 and the cabinet 68 with the lowermost portion of leg member 14 against the floor 72. Platform base 50a is thereafter placed beneath the underside of the outer edge of cabinet 68 in approximately the center thereof, as illustrated in FIG. 4, with platform side 50b flush against the respective side of cabinet 68. The wedge support 62 is thereafter moved upwards along shaft 40 until wedge boss 66 abuts against the underside of base 50a, as illustrated in FIG. 3 and FIG. 4. The leveling nut 58 is thereafter rotated until it abuts against the underside of wedge support 62, thereby assuring that platform 50 maintains a flush engagement with the lip or underside edge and side of cabinet 68. The hand nut 34 is thereafter rotated in the appropriate direction until shoulder 36 abuts against bearing 30 atop shoulder 26. The aforementioned steps are thereafter repeated with an additional lift apparatus 10b on the opposite side of furnace 70 in approximately the center of cabinet 68, assuming it is desired to raise cabinet 68 entirely off furnace 70.

Referring to FIG. 4, the evaporator coil cabinet 68 may be lifted off the top of furnace 70 by merely rotating the respective hand nuts 34 of lifts 10a and 10b in a first direction. The rotation of hand nuts 34 drives or urges shaft 40 and platform 50 upwards away from leg member 12 due to the threaded engagement between nut 34 and shaft 40 within passage 38 as well as the counteractive force of shoulder 36 against shoulder 26 through bearing 30. That is, rotation of hand nut 34 in a first direction urges shaft 40 upward away from leg member 12 and nut 34 downward against leg member 12. As the respective platforms 50 are moved upwards relative to leg member 12, apparatus 10a and 10b will lift and temporarily support the evaporator coil cabinet 68, as illustrated in FIG. 4. Once the evaporator coil cabinet 68 has been lifted a sufficient distance, as illustrated in FIG. 4, the furnace 70 may be serviced and/or replaced. Once such servicing and/or replacement is completed, however, hand nuts 34 may merely be rotated in a second, opposite direction to urge or drive shafts 40 and platforms 50 downward toward the respective leg members 12, thereby lowering cabinet 68 atop furnace 70. The respective lifts 10a and 10b may thereafter be removed by sliding the respective platforms 50 outward from under cabinet 68.

Bearing 30 is preferably a thrust roller bearing which permits exertion of pressure on its upper surface 30a and lower surface 30b, as illustrated in FIG. 2. It is to be understood that the upper bearing surface 30a is in contact with shoulder 36 and that the lower bearing surface 30b is in contact with shoulder 26 during usage of lift 10, as further illustrated in FIG. 2. Bearing 30 thereby permits the ready rotation of nut 34 in a first direction or a second direction, opposite the first direction. Leg member 12 thus remains stable and does not move or rotate upon rotation of nut 34.

It is to be understood that normally two lifts 10 will be utilized on opposite sides of the cabinet 68 to lift and temporarily support cabinet 68 completely off of furnace 70 with the foregoing steps repeated with respect to the additional lift; however, only one lift 10 may be utilized if it is only desired to lift one side of the cabinet 68. Further, the two lifts 10 will normally raise the cabinet 68 and duct work (not shown) approximately one inch (1") away from furnace 70, such distance normally being sufficient to accomplish the desired servicing and/or replacement of furnace 70. The telescopic engagement between shaft 40 and upper leg portion 16 permits extension of platform 50 from a minimum of approximately forty-four inches (44") to a maximum of approximately sixty-three inches (63"). The leg member 12 and platform 50 of lift 10 are preferably manufactured of galvanized pipe and angle iron, respectively. The remaining components of lift 10 are preferably machined and/or manufactured in conventional fashion of tool steel or iron.

Referring to FIG. 5, the utilization of the leveling nut 58 and wedge support 62 to achieve a consistent flush engagement between the platform 50 and cabinet 68 is illustrated. It is to be understood that the clearance between the sides of furnace 70 and adjacent walls 74a and 74b will normally effect the angle of incidence between lifts 10a and 10b, respectively, and furnace 70. That is, a greater distance D' between wall 74a and furnace 70 will normally create a greater angle of incidence alpha ($\alpha$), as illustrated by lift 10a and furnace 70 in FIG. 5. Likewise, a smaller distance D" between wall 74b and furnace 70 will create a smaller angle of incidence beta ($\beta$), as illustrated by lift 10b and furnace 70 in FIG. 5. Nevertheless, base 50a and side 50b of platforms 50 will remain flush against the underside and side, respectively, of cabinet 68 regardless of the distance between the furnace and adjacent wall and/or the aforementioned angle of incidence. This is due to the fact that platform 50 may be rotated about bolt 52 and bushing 42 until the aforementioned flush engagement is achieved; the wedge support 62 is thereafter moved upward toward platform 50 until boss 66 abuts against the underside of base 50a. The wedge support 62 and flush platform 50 are thereafter locked in place by rotating leveling nut 58 until nut 58 abuts and locks against the underside of wedge support 62. Utilization of the evaporator lift 10 thus requires only approximately two and one-half inches (2½") of clearance between the furnace 70 and adjacent wall(s).

While the evaporator lift and method for using same have been described in connection with the preferred embodiment, it is not intended to limit the invention to the particular form set forth, but on the contrary, it is intended to cover such alternatives, modifications, and equivalents as may be included within the spirit and scope of the invention as defined by the appended claims.

I claim:

1. Apparatus for lifting or supporting an object, such as an evaporator coil cabinet, comprising:
   a leg member;
   a platform adapted for engagement with an edge of said object;
   a platform shaft connected on a first end to said platform, said platform being rotatable about said first end of said shaft, said apparatus further comprising means for maintaining said platform in flush engagement with said edge of said object comprising support means axially slidable along said shaft for abutting an underside of said platform and a leveling nut in threaded engagement with said shaft for abutting an underside of said support means, said shaft having a second end adapted for telescopic engagement with said leg member; and
   means for moving said platform upwards or downwards relative to said leg member.

2. Apparatus for lifting or supporting an object, such as an evaporator coil cabinet, as recited in claim 1, wherein said means for moving said platform relative to said leg member comprises a hand nut in threaded engagement with said shaft, said hand nut having a nut shoulder for abutting against a first side of a bearing, said bearing having a second side abutting a leg shoulder on an uppermost end of said leg member.

3. Apparatus for lifting a housing, comprising:
   a leg member;
   a platform adapted for engagement with an edge of said housing;
   a platform shaft connected on a first end to said platform, said platform being rotatable about said first end of said shaft, said apparatus further comprising means for maintaining said platform in flush engagement with said edge of said housing, said means for maintaining said platform in flush engagement with said edge of said housing comprising a wedge support axially slidable along said shaft, said wedge support having a wedge boss for abutting an underside of said platform, and a leveling nut in threaded engagement with said shaft for abutting an underside of said wedge support, said shaft having a second end adapted for telescopic engagement with said leg member; and
   means for moving said platform upwards or downwards relative to said leg member.

4. Apparatus for lifting or supporting a housing, comprising:
   a first leg member and a second leg member;
   a first platform adapted for engagement with a first edge of said housing and a second platform adapted for engagement with a second edge of said housing;
   a first platform shaft connected on a first end to said first platform, said first platform being rotatable about said first end of said first shaft, said apparatus further comprising means for maintaining said first platform in flush engagement with said first edge of said housing comprising a first wedge support axially slidable along said first shaft for abutting an underside of said first platform and a first leveling nut in threaded engagement with said first shaft for abutting an underside of said first wedge support, said first shaft having a second end adapted for telescopic engagement with said first leg member;
   a second platform shaft connected on a first end to said second platform, said second platform being rotatable about said first end of said second shaft, said apparatus further comprising means for maintaining said second platform in flush engagement with said second edge of said housing comprising a second wedge support axially slidable along said second shaft for abutting an underside of said second platform and a second leveling nut in threaded engagement with said second shaft for abutting an underside of said second wedge support, said second shaft having a second end adapted for telescopic engagement with said second leg member; and
   first means for moving said first platform upwards or downwards relative to said first leg member and second means for moving said second platform upwards or downwards relative to said second leg member, said first and second platforms lifting or supporting said housing upon upward movement thereof relative to said leg members.

5. Apparatus for lifting or supporting an object, such as an evaporator coil cabinet, comprising:
   a leg member;
   a platform adapted for engagement with an edge of said object;
   a platform shaft connected on a first end to said platform, said platform being rotatable about said first end of said shaft, said apparatus further comprising means for maintaining said platform in flush engagement with said edge of said object comprising support means axially slidable along said shaft, said support means including a wedge bar for abutting an underside of said platform, and a leveling nut in threaded engagement with said shaft for abutting an underside of said support means, said shaft having a second end adapted for telescopic engagement with said leg member; and
   means for moving said platform upwards or downwards relative to said leg member comprising a hand nut in threaded engagement with said shaft, said hand nut having a nut shoulder for abutting against a first side of a bearing, said bearing having a second side abutting a leg shoulder on an uppermost end of said leg member.

6. Apparatus for lifting or supporting an object, as recited in claim 1, wherein said leg member has a lower portion and an upper portion and wherein said lower portion is detachable from said upper portion.

7. Apparatus for lifting or supporting an object, as recited in claim 2, further comprising means for prohibiting disengagement of said hand nut from said shaft.

8. Apparatus for lifting or supporting an object, as recited in claim 7, wherein said means for prohibiting disengagement of said hand nut from said shaft comprises a weld spot on said second end of said shaft.

9. Apparatus for lifting or supporting a housing, as recited in claim 3, wherein said means for moving said platform relative to said leg member comprises a hand nut in threaded engagement with said shaft, said hand nut having a nut shoulder for abutting against a first side of a bearing, said bearing having a second side abutting a leg shoulder on an uppermost end of said leg member.

10. Apparatus for lifting or supporting a housing, as recited in claim 4, wherein said first means for moving said first platform upwards or downwards relative to said first leg member comprises a first hand nut in threaded engagement with said first shaft, said first hand nut having a first nut shoulder for abutting against a first side of a first bearing, said first bearing having a second side abutting a first leg shoulder on an uppermost end of said first leg member and wherein said second means for moving said second platform upwards or downwards relative to said second leg member comprises a second hand nut in threaded engagement with said second shaft, said second hand nut having a second nut shoulder for abutting against a first side of a second bearing, said second bearing having a second side abutting a second leg shoulder on a uppermost end of said second leg member.

11. Apparatus for lifting or supporting an object, as recited in claim 1, wherein said support means comprises a support housing having a passage therethrough within which to receive said shaft and an upstanding bar connected to said support housing for abutting an underside of said platform.

* * * * *